United States Patent [19]
Bhat et al.

[11] Patent Number: 4,843,294
[45] Date of Patent: Jun. 27, 1989

[54] SOLAR ARRAY STEPPING TO MINIMIZE ARRAY EXCITATION

[75] Inventors: Mahabaleshwar K. P. Bhat, San Jose; Tung Y. Liu, Union City; Carl T. Plescia, Sunnyvale, all of Calif.

[73] Assignee: Ford Aerospace & Communications Corporation, Detroit, Mich.

[21] Appl. No.: 127,344

[22] Filed: Dec. 1, 1987

[51] Int. Cl.$^4$ .............................................. H02P 8/00
[52] U.S. Cl. .................... 318/696; 318/685; 318/460; 369/265; 244/170
[58] Field of Search ............... 244/173, 170; 318/696, 318/685, 460; 369/265

[56] References Cited

U.S. PATENT DOCUMENTS

| | | | |
|---|---|---|---|
| 3,188,546 | 6/1965 | Dawkins | 318/460 |
| 4,258,622 | 3/1981 | Estraband et al. | 318/696 X |
| 4,425,638 | 1/1984 | Suzuki et al. | 369/265 |
| 4,475,185 | 10/1984 | Fujio et al. | 369/265 |
| 4,481,453 | 11/1984 | Welbur | 318/696 |
| 4,732,354 | 3/1988 | Lièvre | 244/170 |

Primary Examiner—William M. Shoop, Jr.
Assistant Examiner—Saul M. Bergmann
Attorney, Agent, or Firm—Edward J. Radlo; Kenneth R. Allen; Keith L. Zerschling

[57] ABSTRACT

Mechanical oscillations of a mechanism containing a stepper motor, such as a solar-array powered spacecraft, are reduced and minimized by the execution of step movements in pairs of steps, the period between steps being equal to one-half of the period of torsional oscillation of the mechanism. Each pair of steps is repeated at needed intervals to maintain desired continuous movement of the portion of elements to be moved, such as the solar array of a spacecraft. In order to account for uncertainty as well as slow change in the period of torsional oscillation, a command unit may be provided for varying the interval between steps in a pair.

6 Claims, 2 Drawing Sheets

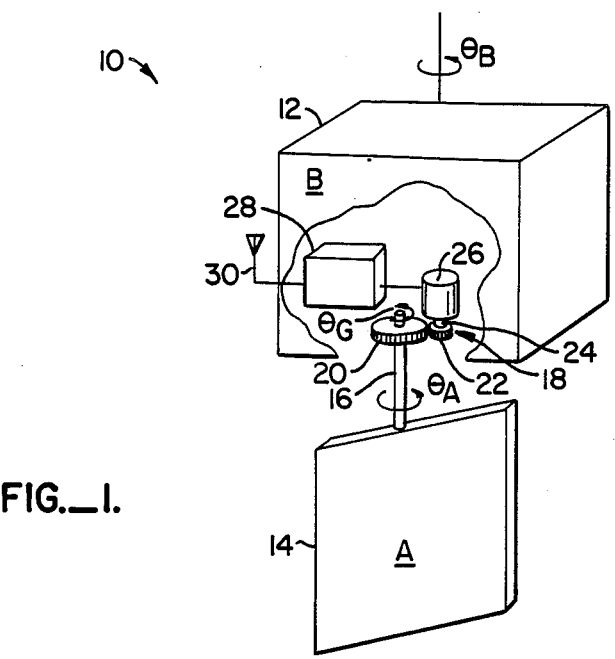
FIG._1.
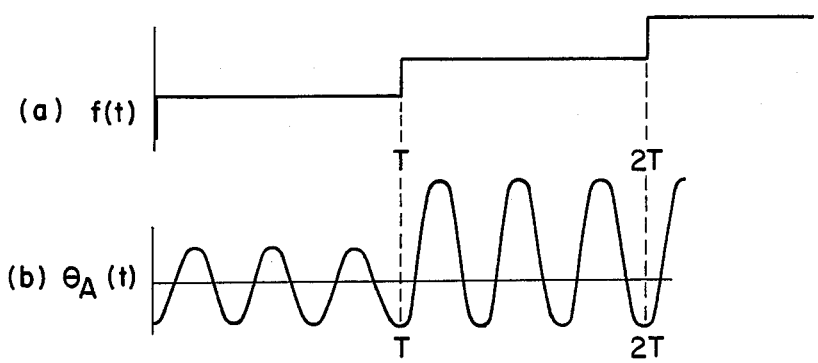
FIG._2.(PRIOR ART)
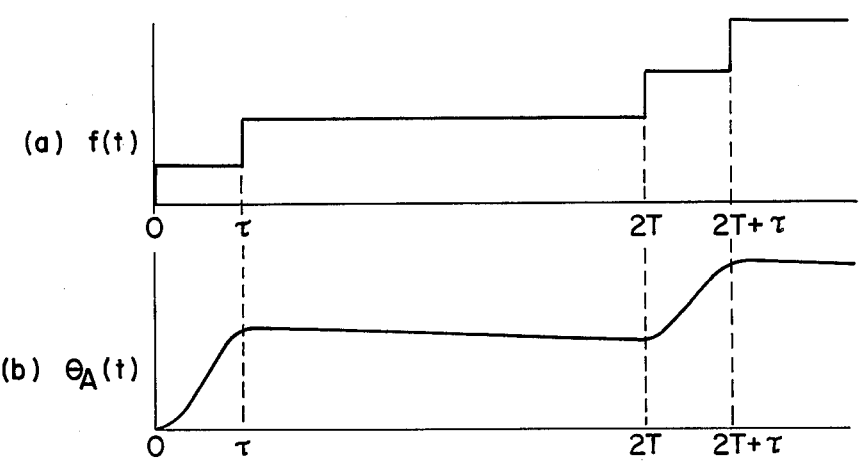
FIG._3.

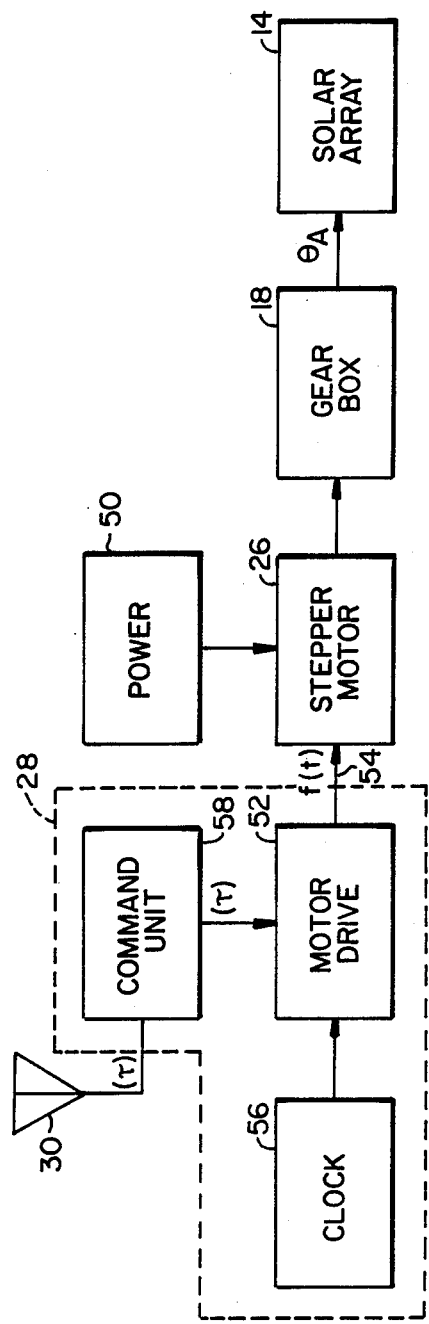
FIG._4.

SOLAR ARRAY STEPPING TO MINIMIZE ARRAY EXCITATION

The invention described herein was made in the performance of work under NASA Contract No. NAS 5-29500 and is subject to the provisions of Section 305 of the National Aeronautics and Space Act of 1958, as amended (72 Stat. 435; 42 USC 2457).

BACKGROUND OF THE INVENTION

1. Field of the Invention

This invention relates to techniques for controlling the attitude of a spacecraft and more particularly, to controlling spacecraft attitude with minimal vibration. The invention has particular application to spacecraft having large solar arrays in geosynchronous orbit wherein a solar array is continuously tracking the sun, as well as any apparatus where it is desirable to minimize vibration introduced by stepped excitation.

A class of spacecraft known as three-axis stabilized spacecraft employ a solar array to generate power for the spacecraft. The solar array must be maintained in a position normal to the sun to absorb the optimum amount of radiation. Because the solar array must be maintained normal to the sun, a servo controlled stepping mechanism, e.g., a stepping motor in connection with an appropriate gear train, is typically employed to cause the solar array to track the sun while the spacecraft is in constant relative rotation to the sun in an orbit about the earth. Other types of attitude control mechanisms, such as dc motors, prove to be relatively difficult to control and heavy in applications of this class. However, in theory, servo controlled dc motors would not generate oscillation. It is desirable to use stepper motors because stepper motors are relatively simple to control, reliable, lightweight and well adapted to continuous use.

One of the major problems with the use of the stepping motor is that the stepping action can excite a highly flexible array such that oscillation is induced within the spacecraft. The induced oscillation is particularly critical in spacecraft where absolute platform stability is desirable or required, such as platforms for high resolution optical imaging systems. Vibrations can cause deterioration of any inertia-sensitive operations of a spacecraft. Therefore, it is desirable to solve the problem of induced oscillation caused by a stepper motor.

Oscillation and jitter do not present a problem in certain classes of spacecraft where on-board systems are not sensitive to the oscillation induced by the stepper motor, as for example, conventional communications satellites.

2. Description of the Relevant Literature

The following references were noted during search of U.S. Patent Office records in respect to this invention:

European Patent Application No. 95,375 in the name of Rees. This application describes a spacecraft solar array pointing drive which uses a stepper motor, with the object of achieving smoother array movement with a small gear ratio and hence less of an overtorque requirement. The thrust of this disclosure is the achievement of fractional parts of the step through single step changes of the drive signals. However, the problem of mechanical resonance of the load is not addressed in this disclosure.

U.S. Pat. No. 3,828,234 to Goldberg. This patent is related to the generation of an error signal to drive a stepper motor. An error signal is generated as the difference between a reference signal and a phase signal derived from the windings the stepper motor. This patent is not particularly relevant to the subject invention.

U.S. Pat. No. 4,072,884 to Treadwell. This patent deals with speed and direction of rotation control of a brushless dc motor. This patent extends the teaching of the '234 patent above to include direction control. An error signal for driving the motor derived from a reference signal and a signal from the motor windings. The reference signal is variable.

U.S. Pat. No. 4,076,191 to Binge. This patent describes a mechanical arrangement of bearings and the preloading of bearings to provide high stiffness and to accommodate thermal expansion between shafts and housings. Stiffening may increase structural resonance frequencies in lateral directions but has no effect on resonant frequencies about the axis of rotation. Thus, this patent fails to offer any solution to the class of problem addressed by the present invention.

SUMMARY OF THE INVENTION

According to the invention, mechanical oscillations of a mechanism containing a stepper motor, such as a solar-array powered spacecraft, are reduced and minimized by the execution of step movements in pairs of steps, the time interval between steps being equal to one-half of the period of torsional oscillation of the mechanism. Each pair of steps is repeated as needed and generally at regular intervals to maintain desired continuous movement of the portion of elements to be moved, such as the solar array of a spacecraft. In order to account for uncertainty as well as slow change in the period of torsional oscillation, means may be provided for varying the interval between steps in a pair.

This invention has been shown to significantly reduce torsional oscillation induced by array movement in a spacecraft.

The invention will be better understood by reference to the following detailed description taken in connection with the accompanying drawings.

BRIEF DESCRIPTION OF THE DRAWINGS

FIG. 1 is a perspective view in partial cutaway of representation of spacecraft having a stepper motor controller operative in accordance with the invention.

FIG. 2 is a timing diagram showing the operation of the prior art comparison with FIG. 3.

FIG. 3 is a timing diagram showing the operation in accordance with the invention.

FIG. 4 is a block diagram of a circuit operative in accordance with the invention.

DESCRIPTION OF SPECIFIC EMBODIMENTS

Referring to FIG. 1, there is shown a perspective view in partial cutaway of a representation of a spacecraft. 10 having features in accordance with the invention. Specifically, the spacecraft 10 includes a satellite body 12, a solar array 14 mounted via a shaft 16 or the like to the satellite body through a gear box 18, comprising, for example, a first gear 20 coupled to the array shaft 16 and a second gear 22 coupled to a motor shaft 24 of a stepper motor 26. Stepper motor 26 is driven by motor drive electronics generally designated motor drive 28. Occasional command signals may be directed to the spacecraft 10 from a control station on the earth for example. To this end, an antenna 30 may be provided on the spacecraft 10 whereby signals may be coupled to the array drive 28.

The array 14 is designated as element A. The satellite body 12 is designated as element B. When the stepper motor 26 is activated, a torque is developed by the motor 26 which is transmitted to the solar array shaft 16 through the gear box 18. The rotation angles relative to a common rotation axis of the gear 20 and of the array 14 are given, respectively, by $\theta_g$ $\theta_a$. In addition, associated with each of the elements is a moment of inertia designated, respectively, by $I_G$ $I_A$, as hereinafter explained.

The simplified equations of motion relating the torque $T_M$ applied by the stepping motor are as follows:

$$I_G \ddot{\theta}_G + K(\theta_G - \theta_A) = T_M \quad (1)$$

$$I_A \ddot{\theta}_A + K(\theta_A - \theta_G) = 0 \quad (2)$$

where $\theta_G$ and $\theta_A$ are the rotation angles of the gear and the array;

$I_G$ and $I_A$ are the moments of inertia of the gear and the array about the axis of rotation of the array;

K is the torsional stiffness of the array; and $T_M$ is the torque applied by the stepper motor.

From the equation (2) it follows:

$$\ddot{\theta}_A + \omega^2 \theta_A = \omega^2 \theta_G \quad (3)$$

where $\omega = [(k/I_A)]^{\frac{1}{2}}$ is the torsional frequency in radians/sec.

Referring to FIG. 2, there is shown a timing diagram showing the operation of a prior art excitation mode. Specifically, if the rotation angle $\theta_G$ is a function f(t) of the following form:

$$\theta_G = f(t) = \sum_{K=0}^{n} u(t - kT) \quad (4)$$

Where u(t) is the unit step function, as shown in part (a) of FIG. 2, then it can be shown that the angular rotation with respect to time of the array, given by $\theta_A(t)$, is given by:

$$\theta_A{}^n(t) = \sum_{k=0}^{n-1} 1 - \cos \omega(t - kT) \quad (5)$$

This is shown as part (b) of FIG. 2, where T is the time interval between steps based on the gear ratio which is necessary to maintain the desired rate of revolution. In the case of a geostationery satellite, the rate of revolution is one revolution per day for the array.

Unless there is some damping of the oscillation, oscillations will continue to grow with every step of excitation. More specifically, the oscillation after N steps given by the formula:

$$\theta(t) = \theta_A{}^n(t) - \theta_G{}^n(t) = \sum_{K=0}^{n-1} \cos \omega(t - kT) = \frac{\sin n\pi\delta}{\sin \pi\delta} \quad (6)$$

where $\delta = \frac{\omega T}{2\pi} - \text{Integer } \frac{\omega T}{2\pi}$.

If $\delta$ goes to 0, then the oscillation amplitude after n steps is equal to n, thus growing as n. It will be recognized that this is a dangerous condition in the case of a satellite, where it is difficult to damp oscillations.

Therefore, it is important to provide a mechanism for eliminating oscillation or at the very least minimizing oscillation in the long term.

Therefore, according to the invention, the stepper motor is excited in accordance with the following criteria: a first step signal is applied to a stepper motor at a first time to induce a first step movement of the device (the array 14) in a first direction, namely, a first angular rotation of a preselected fractional amount (as determined by the stepper motor and gearing). Thereafter, a second step signal is applied to the stepper motor to induce a second step movement in the same angular direction but at a fixed time following the first time by one-half of the oscillation period of the device which must be stabilized. Thus, according to the invention the second step movement will counteract and preferably cancel induced oscillation induced in the device by the first step movement while the device still advances in motion in the desired direction. Stated mathematically, the excitation function is given by the following expression:

$$f(t) = u(t) + u(t - \tau) + u(t - 2T) + u(t - 2T - \tau) \quad (7)$$
$$= \sum_{K=0}^{n-1} u(t - 2kT) + u(t - 2kT - \tau)$$

where $\tau$ is a period factor selected in accordance with the criteria of the invention. Specifically, if $$\tau = \frac{\pi}{\omega} = \frac{P}{2} \quad (8)$$

where P is a period of oscillation of the array, then after the first step in the above formula, the oscillation is given by:

$$\theta(t) = \theta_A(t) - \theta_G(t) = \cos \omega t. \quad (9)$$

It will be immediately recognized that, if undamped, the device will continue to oscillate based on this single step of excitation.

However, if the second step is caused to occur $\tau$ seconds later than for a time greater than $\tau$, the rotation with time is given by the following expression:

$$\theta(t) = \cos \omega t + \cos \omega(t - \tau) \quad (10)$$

Where $\tau$ is equal to P/2, that is, one-half the period of oscillation, then:

$$\theta(t) = 0 \quad (11)$$

after each paired step-type excitations. Accordingly, oscillation is completely eliminated by the second step pair if it follows the first step at a time equal to one-half the period of the oscillation frequency of the device to be moved.

Precisely the same rate of revolution can be maintained in a spacecraft as with an excitation system as suggested in the prior art (FIG. 2) by separating the pairs of successive steps of the same magnitude by an average rate equal to one-half the rate of a comparable unpaired stepping system.

Referring to FIG. 3, there is shown in part (a) the excitation function given in accordance with the invention involving two pairs of identical steps separated by a time $\tau$. The angular rotation of the array with time $\theta_A(t)$ is given by part b. Between time $\tau$ and 2T that is following the first pair of steps, displacement is stable and without oscillation. This is to be compared with the oscillation illustrated line (b) of FIG. 2 representing the prior art.

Referring now to FIG. 4, there is shown a block diagram of a typical control system in accordance with the invention. The solar array 14 is driven by the gear box 18 or gear train 18 which in turn is coupled directly to the stepper motor 26. The stepper motor 26 is provided with a suitable power source 50 to supply motive force to the gear train. The array drive 28 comprises a motor drive 52 which provides the input signal f(t) by appropriate signal lines 54 to the stepper motor 26. The motor drive 52 is governed by a relatively stable clock 56 from which necessary timing can be derived for the function f(t) applied to the stepper motor 26.

In order to provide for variations in the torsional mode of the array 14, which might be caused by changing the weight of the array or by miscalculation of the mass or stiffness of the array in its environment, means may be provided to vary the stepping interval $\tau$ between selected limits. For this purpose, a command unit 58 may be provided which is coupled to the motor drive 52. The command unit 58 receives a remote command signal, i.e., through the antenna 30 which in turn is communicated to the motor drive to modify the drive function. The command unit 58 may however provide the value $\tau$ as a digital value within limits corresponding to maximum expected variation in the torsional mode frequency of the solar array 14.

The invention has now been explained with reference to specific embodiments. Other embodiments will be apparent to those of ordinary skill in the art. For example, it is within the skill of the ordinary artisan to modify the magnitude and even direction of the step or elements of the drive function to establish a net movement of the array which is free of oscillation, in view of the subject disclosure. Therefore, it is not intended that this invention be limited except as indicated by the appended claims.

We claim:

1. A method for controlling induced torsional oscillations in a device excited by a stepper motor, said device having a characteristic torsional mode of oscillation with an oscillation period, said method comprising the steps of:
   applying a first step signal to said stepper motor at a first time to induce a first step movement of said device in a first direction; and
   applying a second step signal to said stepper motor to induce a second step movement in said first direction at a fixed second time following said first time by one-half of said oscillation period of said device, said second step movement for canceling induced oscillations of said device.

2. The method according to claim 1 further including the step of adjusting said second time relative to said first time to adapt to changes in said oscillation period of said device.

3. In a spacecraft having a solar array controlled by a stepper motor, said stepper motor controlled by a stepper motor driver generating repetitive step signals for steadily rotating said solar array, a method for controlling induced torsional oscillations in said array which induces torsional jitter in said spacecraft, said array having a characteristic torsional mode of oscillation with an oscillation period, said method comprising the steps of:
   applying a first step signal through said stepper motor driver to said stepper motor at a first time to induce a first step movement of said device in a first direction; and
   applying a second step signal to said stepper motor to induce a second step movement in said first direction at a fixed second time following said first time by one-half of said oscillation period of said array, said second step movement for canceling said induced oscillations of said array.

4. The method according to claim 3 further including the step of adjusting said second time relative to said first time to adapt to changes in said oscillation period of said array.

5. A method for controlling induced oscillations in a device excited by a stepper motor, said device having a characteristic mode of oscillation with an oscillation period, said method comprising the steps of:
   applying a first step signal to said stepper motor at a first time to induce a first step movement of said device and related induced oscillations; and
   applying a second step signal to said stepper motor to induce a second step movement at a fixed second time following said first time by a period related to said oscillation period of said device in a magnitude and a direction causing cancellation of said induced oscillations of said device.

6. The method according to claim 5 further including the step of adjusting said second time relative to said first time to adapt to changes in said oscillation period of said device.

* * * * *